May 31, 1932.  E. V. BARKER  1,860,920
RESERVE WHEEL ELEMENT MOUNTING
Filed Nov. 10, 1928
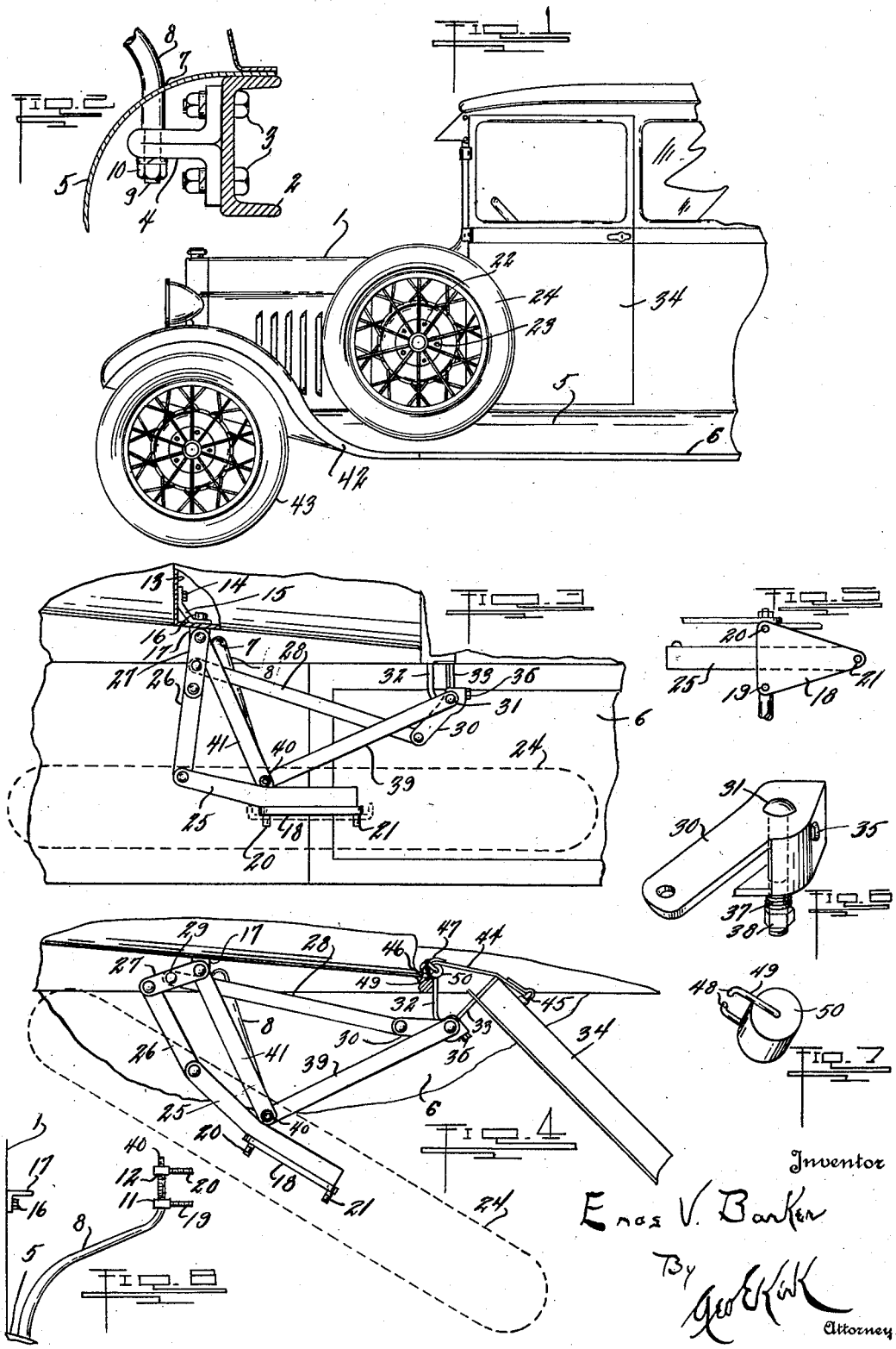
Inventor
Enos V. Barker
By [signature]
Attorney Patented May 31, 1932

1,860,920

UNITED STATES PATENT OFFICE

EROS V. BARKER, OF BELLEVUE, OHIO, ASSIGNOR TO JACOB F. MARTIN, OF BELLEVUE, OHIO

RESERVE WHEEL ELEMENT MOUNTING

Application filed November 10, 1928. Serial No. 318,484.

This invention relates to bracket structures.

This invention has utility as a spare tire or wheel carrier, more particularly for location on a motor vehicle forwardly of the vehicle side door and in the vicinity of the front fender.

Referring to the drawings:

Fig. 1 is a fragmentary view, in side elevation, of an embodiment of the invention as a spare tire or wheel carrier for a motor vehicle, shown as of the type model A Ford;

Fig. 2 is a detail view of the support mounting as assembled with the frame, parts being broken away;

Fig. 3 is a plan view of the device as assembled in Fig. 1, with the door closed;

Fig. 4 is a view similar to Fig. 3, with the door open;

Fig. 5 is a detail view in front elevation of the rockable bracket as directly carrying the spare wheel;

Fig. 6 is a perspective view of the door actuated extension arm for controlling the toggle of the spare wheel carrier;

Fig. 7 is a detail view of the door strap take up for limiting door movement in opening; and Fig. 8 is a side view of the fixed support and the supplemental bracket with which the linkage cooperates in this spare wheel mounting.

Motor vehicle 1 is shown provided with chassis 2 through which extend bolts 3 mounting lug 4. Sheet metal drop portion or extension 5 from above the chassis frame 2 above the running board 6 has perforation 7 formed therein through which stem 8 having threaded terminus 9 extends to be engaged by nut 10 anchoring this stem 8 upwardly and outwardly extending to provide fixed pivot bearings 11, 12.

Foot board 13 rising upward from below the instrument board and in front of the operator is herein shown provided with bolt 14 mounting bracket 15 having bolt 16 carrying protruding ear 17 outside vehicle body 1 and in the vicinity of the stem 8 up-rising and outwardly extending provided with the pivot bearings 11, 12. Plate 18 has stems 19, 20, protrude therethrough from the pivot bearings 11, 12. Additionally, this plate has protruding stem 21, thus providing three stems 19, 20, 21, for protruding through spare wheel openings 22 to receive nuts 23 anchoring spare wheel 24 with this rockable bracket.

This rockable bracket 18 has arm 25 slightly angularly offset, from which extends link 26 to supplemental link 27 connected to the ear 17 as a toggle. This toggle is broken or operated by link 28 having pivotal connection 29 intermediate the extent of this minor link 27. This link 28 extends from the link 27 to arm 30 mounted by hinge pin 31. This hinge pin 31 is carried by fixed hinge leaf 32 mounted at the car body 1. Additionally, this hinge pin carries movable hinge leaf 33 fast with door 34.

The arm 30 has opening 35 for bolt 36 thereby anchoring the arm 30 to swing with the door 34 as the bolt 36 connects this arm 30 with the movable hinge leaf 33. Spring 37 on the hinge pin 31, adjusted by nut 38, takes up lost motion at this hinge pin. As stiffening between the operating points, there is provided from the hinge pin 31 brace or strut a link 39 to extension bearing 40 of the stem 8 above the bearings 11, 12. Also from this bearing 40 is extension brace or strut-link 41 to the ear 17.

In practice, spare tire carrier or spare wheel 24 is mounted on the rockable bracket 18, 25. A tire so located is spaced inwardly from the outer edge of the running board 6. Furthermore, the same may be so spaced from the fender that it is clear of any well or countersink in fender 42 over wheel 43 of the motor vehicle 1.

When the operator or any passenger enters the vehicle by opening the door 34, the swinging of this door to open position effects, during the door movement, a simultaneous rocking of the arm 30 to link 28 to break the toggle 26, 27, and thus swing the forward portion of the spare tire inward toward the vehicle at a less rate of travel than the door opens outward, so that the after portion of the tire or rim in the open position of the door is not out from the vehicle as far as the outer edge of the door.

In practice, this opening movement of the door is desirably limited. Initially, this limiting of open swing of the door is by flexible strap 44 between anchor 45 on the inside of the door 34 near the floor of the vehicle from anchor 46 in the vehicle. This anchor 46 is through an eye or loop 47 in the flexible strap 44. A simple scheme for further restricting the outward swing of the door is by snapping in-turned ends 48 (Fig. 7) of U-spring 49 into the clearance of the eye 47 (Fig. 4) near the anchor 46 so that roller 50 may ride between the strap 44 and its inner underside toward the vehicle body. Even with this restriction, the door may open approximately 45° and thus give ample clearway for entrance to and exit from the vehicle.

The struts 39, 41, from the fixed points on hinge pin 31 and ear 17 give supplemental rigidity to the upper free end of the fixed support provided by the stem 8 and in the linkage for the action in door opening. On door closing, the arm 30 pulls the link 28 and thus swings the toggle 27, 26, into an approximately straight line or locked position for substantially retaining the spare wheel and tire in an approximately parallel direction with the vehicle and against vibration during vehicle operation.

What is claimed and it is desired to secure by Letters Patent is:

1. A vehicle body, a door therefor, a hinge for the door, a support fixed on the body and provided with a pivot bearing, and a rockable bracket mounted on said pivot bearing and connected to the hinge independently of the door to be actuated by the door movement for shifting the bracket as to the door.

2. A vehicle body, a door therefor, a support fixed on the body and provided with a pivot bearing, a rockable bracket mounted on said pivot bearing, and linkage providing holding means for connecting the bracket two ways between the bracket and body.

3. A vehicle body, a door therefor, a hinge for the door, a support fixed on the body and provided with a pivot bearing, a rockable bracket mounted on said pivot bearing, and holding strut means for the bracket directly between the bracket and door hinge.

4. A vehicle body, a door therefor, a hinge for the door, a support fixed on the body and provided with a pivot bearing, a rockable bracket mounted on said pivot bearing, and holding strut means for the bracket directly between the bracket, door hinge, and body.

5. A vehicle body, a door therefor, a support fixed on the body and provided with a pivot bearing, a rockable bracket mounted on said pivot bearing, and holding linkage for the bracket including a toggle between the bracket and body.

6. A vehicle body, a door therefor, a hinge for the door, a support fixed on the body and provided with a pivot bearing, a rockable bracket mounted on said pivot bearing, holding linkage between the body and bracket, and holding linkage between the hinge and bracket connected to be acted upon by door movement for shifting the bracket relative to the body.

7. A vehicle body, a door therefor, a hinge for the door, a support fixed on the body and provided with a pivot bearing, a rockable bracket mounted on said pivot bearing, a toggle between the body and bracket, and a toggle control link connected to the hinge to be operated by the door.

8. A vehicle body, a door therefor, a hinge for the door, a support fixed on the body and provided with a pivot bearing, a rockable bracket mounted on said pivot bearing, a toggle joint connecting the body and the bracket, an extension fixed on the hinge and movable with the door, and a toggle control link connecting said extension with one of said toggle links.

9. A vehicle body, a door therefor, a hinge for the door, a support fixed on the body and provided with a pivot bearing, a rockable bracket mounted on said pivot bearing, a strut link from the hinge to the pivot support, a strut link from the body to the pivot support, a toggle joint extension between the body and bracket, an extension arm from the hinge fixed with the door, and a link from the arm to operate the toggle joint in the door movement and thereby rock said bracket.

10. A vehicle body, a door therefor, a hinge for the door, a support fixed on the body and provided with a pivot bearing, a rockable bracket mounted on said pivot bearing having an arm thereon, a toggle joint extending from said arm to the body, and door operated linkage for controlling said toggle.

In witness whereof I affix my signature.

EROS V. BARKER.